(12) United States Patent
Yabuki

(10) Patent No.: US 8,874,963 B2
(45) Date of Patent: Oct. 28, 2014

(54) OPERATIONS MANAGEMENT APPARATUS, OPERATIONS MANAGEMENT METHOD AND PROGRAM THEREOF

(75) Inventor: Kentarou Yabuki, Tokyo (JP)

(73) Assignee: NEC Corporation, Tokyo (JP)

( * ) Notice: Subject to any disclaimer, the term of this patent is extended or adjusted under 35 U.S.C. 154(b) by 247 days.

(21) Appl. No.: 13/579,538

(22) PCT Filed: Dec. 16, 2011

(86) PCT No.: PCT/JP2011/079963
§ 371 (c)(1),
(2), (4) Date: Aug. 16, 2012

(87) PCT Pub. No.: WO2012/086824
PCT Pub. Date: Jun. 28, 2012

(65) Prior Publication Data
US 2013/0159778 A1    Jun. 20, 2013

(51) Int. Cl.
*G06F 11/00* (2006.01)
(52) U.S. Cl.
USPC ............................................ 714/26; 714/47.3
(58) Field of Classification Search
CPC ............ G06F 11/3452; G06F 11/3466; G06F 11/3006
USPC ...................... 714/26, 33, 37, 47.3
See application file for complete search history.

(56) References Cited

U.S. PATENT DOCUMENTS 7,552,447 B2 *  6/2009  Uthe .............................. 719/318
7,975,186 B2     7/2011  Kato
8,190,949 B2     5/2012  Kato
8,719,636 B2 *  5/2014  Yabuki ........................... 714/26

(Continued)

FOREIGN PATENT DOCUMENTS

JP      2007-323193 A     12/2007
JP      2009-199533 A      9/2009
WO  WO 2010/032701 A1     3/2010

OTHER PUBLICATIONS

International Search Report in PCT/JP2011/079963 dated Mar. 13, 2012 (English Translation Thereof).

*Primary Examiner* — Joshua Lohn
(74) *Attorney, Agent, or Firm* — McGinn IP Law Group, PLLC

(57) ABSTRACT

A candidate to cause a fault is identified, in case that correlation destruction is detected in some processing apparatuses or the like due to spread of the fault within a system.

A correlation destruction detecting unit 104 detects correlation destruction related to a correlation which is included in a correlation model 122 by applying inputted performance value of a monitored object to the correlation model 122 of the monitored object which a correlation model storing unit 112 stores. The fault analyzing unit 105 determines and outputs the monitored object which should be a candidate to cause a fault through comparing results of judging whether detecting or not detecting the correlation destruction related to a common correlation in a plurality of the monitored objects which are connected directly or indirectly with a common apparatus or common the monitored object and which have the correlation models 122 including the common correlation.

25 Claims, 11 Drawing Sheets

(56) References Cited

U.S. PATENT DOCUMENTS

| | | | |
|---|---|---|---|
| 2008/0004841 A1* | 1/2008 | Nakamura | 702/186 |
| 2009/0216624 A1* | 8/2009 | Kato | 705/10 |
| 2009/0217099 A1* | 8/2009 | Kato | 714/37 |
| 2010/0205483 A1* | 8/2010 | Ishiou | 714/26 |
| 2010/0218031 A1* | 8/2010 | Agarwal et al. | 714/2 |
| 2011/0161743 A1 | 6/2011 | Kato | |
| 2011/0225462 A1* | 9/2011 | Kato | 714/47.1 |
| 2012/0030522 A1* | 2/2012 | Yabuki | 714/47.1 |
| 2012/0069747 A1* | 3/2012 | Wang et al. | 370/252 |
| 2012/0185737 A1* | 7/2012 | Ishiou | 714/48 |
| 2012/0192014 A1 | 7/2012 | Kato | |

* cited by examiner

| TIME | SV1.CPU_U | SV1.MEM_U | SV1.Disk_U | SV1.Disk_IO | SV2.CPU_U | ... |
|---|---|---|---|---|---|---|
| 2010/6/1(TUE) 10:00 | 15 | 79 | 50 | 30 | 32 | ... |
| 2010/6/1(TUE) 10:05 | 18 | 51 | 25 | 34 | 32 | ... |
| 2010/6/1(TUE) 10:10 | 22 | 51 | 25 | 55 | 35 | ... |
| 2010/6/1(TUE) 10:15 | 20 | 81 | 50 | 43 | 50 | ... |
| .. | .. | .. | .. | .. | .. | .. |

Fig.10

| GROUP IDENTIFIER | APPARATUS IDENTIFIER | DEGREE OF SIMILARITY |
|---|---|---|
| GP1 | SV1 | 1.00 |
| | SV2 | 1.00 |
| | SV3 | 1.00 |
| | SV4 | 1.00 |
| GP2 | SV5 | 0.84 |
| | SV6 | 0.84 |
| | SV7 | 0.74 |
| | SV8 | 0.84 |

OPERATIONS MANAGEMENT APPARATUS, OPERATIONS MANAGEMENT METHOD AND PROGRAM THEREOF

TECHNICAL FIELD

The present invention relates to an operations management apparatus, an operations management method and a program thereof, and in particular, relates to an operations management apparatus, an operations management method and a program thereof which detect a fault of a system.

BACKGROUND ART

An example of an operations management system, which detects a fault of a system through generating a system model from time-domain sequential information on system performance and using the generated system model, is disclosed in a patent literature 1.

According to the operations management system which is disclosed in the patent literature 1, on the basis of measured values of plural types of performance values on the system, a correlation function for each pair of the plural types is determined, and then a correlation model including a plurality of the correlation functions is generated. Then, the operations managing system judges by use of the generated correlation model whether correlation destruction is caused in the measured performance value which is inputted newly, and identifies a cause of the fault through detecting the performance type which causes the converged correlation destruction.

CITATION LIST

Patent Literature

[Patent Literature 1] Japanese Patent Application Laid-Open No. 2009-199533

SUMMARY OF INVENTION

Technical Problem

The operations management system disclosed in the above-mentioned patent literature 1 has a problem that it is difficult to identify the cause of the fault on the basis of the correlation destruction in the case that the fault caused in a certain processing apparatus or the like, which is a monitored object within the system, spreads to the surrounding processing apparatuses or the like, and consequently the correlation destruction is caused in a plurality of the processing apparatuses or the like.

An object of the present invention is to solve the problem through providing an operations management apparatus, an operations management method, and a program thereof which can identify a candidate to cause the fault even if the correlation destruction is detected in some processing apparatuses or the like due to the spread of the fault within the system.

Solution to Problem

A first operations management apparatus according to an exemplary aspect of the invention includes correlation model storing means for storing a correlation model including one or more correlation functions each of which indicates a correlation for a pair of types of performance values out of a plural types of performance values, for each of plural monitored objects, correlation destruction detecting means for detecting correlation destruction related to a correlation which is included in the correlation model by applying inputted the performance value of the monitored object to the correlation model of the monitored object which the correlation model storing means stores, and fault analyzing means for determining and outputting the monitored object which should be a candidate to cause a fault through comparing results of judging whether detecting or not detecting the correlation destruction related to a common correlation in a plurality of the monitored objects which are connected directly or indirectly with a common apparatus or common the monitored object and which have the correlation models including the common correlation.

A first operations management method according to an exemplary aspect of the invention includes storing a correlation model including one or more correlation functions each of which indicates a correlation for a pair of types of performance values out of a plural types of performance values, for each of plural monitored objects, detecting correlation destruction related to a correlation which is included in the correlation model by applying inputted the performance value of the monitored object to the correlation model of the monitored object, and determining and outputting the monitored object which should be a candidate to cause a fault through comparing results of judging whether detecting or not detecting the correlation destruction related to a common correlation in a plurality of the monitored objects which are connected directly or indirectly with a common apparatus or common the monitored object and which have the correlation models including the common correlation.

A computer readable storage medium according to an exemplary aspect of the invention, records thereon a program, causing a computer to perform a method including storing a correlation model including one or more correlation functions each of which indicates a correlation for a pair of types of performance values out of a plural types of performance values, for each of plural monitored objects, detecting correlation destruction related to a correlation which is included in the correlation model by applying inputted the performance value of the monitored object to the correlation model of the monitored object, and determining and outputting the monitored object which should be a candidate to cause a fault through comparing results of judging whether detecting or not detecting the correlation destruction related to a common correlation in a plurality of the monitored objects which are connected directly or indirectly with a common apparatus or common the monitored object and which have the correlation models including the common correlation.

A second operations management apparatus according to an exemplary aspect of the invention includes correlation model storing means for storing a correlation mode including one or more correlation functions each of which indicates a correlation for a pair of types of performance values out of a plural types of performance values, for each of plural monitored objects, correlation destruction detecting means for detecting correlation destruction related to a correlation which is included in the correlation model by applying inputted the performance value of the monitored object to the correlation model of the monitored object which the correlation model storing means stores, and fault analyzing means for determining and outputting the monitored object which should be a candidate to cause a fault through comparing results of judging whether detecting or not detecting the correlation destruction related to a common correlation in the plural monitored objects which provide the same function each other, the plural monitored objects receiving a request for processing issued by a common apparatus or common the monitored object or using a result of a process carried out by a common apparatus or common the monitored object.

A second operations management method according to an exemplary aspect of the invention includes storing a correlation mode including one or more correlation functions each of which indicates a correlation for a pair of types of performance values out of a plural types of performance values, for each of plural monitored objects, detecting correlation destruction related to a correlation which is included in the correlation model by applying inputted the performance value of the monitored object to the correlation model of the monitored object, and determining and outputting the monitored object which should be a candidate to cause a fault through comparing results of judging whether detecting or not detecting the correlation destruction related to a common elation in the plural monitored objects which provide the same function each other, the plural monitored objects receiving a request for processing issued by a common apparatus or common the monitored object or using a result of a process carried out by a common apparatus or common the monitored object.

Advantageous Effect of Invention

An effect of the present invention is that it is possible to identify the cause of the fault even if the correlation destruction is detected in some processing apparatuses or the like due to the spread of the fault within the system.

BRIEF DESCRIPTION OF DRAWINGS

FIG. 10 A diagram showing a result of calculating degree of to similarity on a result of judging whether detecting or not detecting the correlation destruction according to the first exemplary embodiment of the present invention.

DESCRIPTION OF EMBODIMENTS

First Exemplary Embodiment

Next, a first exemplary embodiment according to the present invention will be described.

Figure 2:
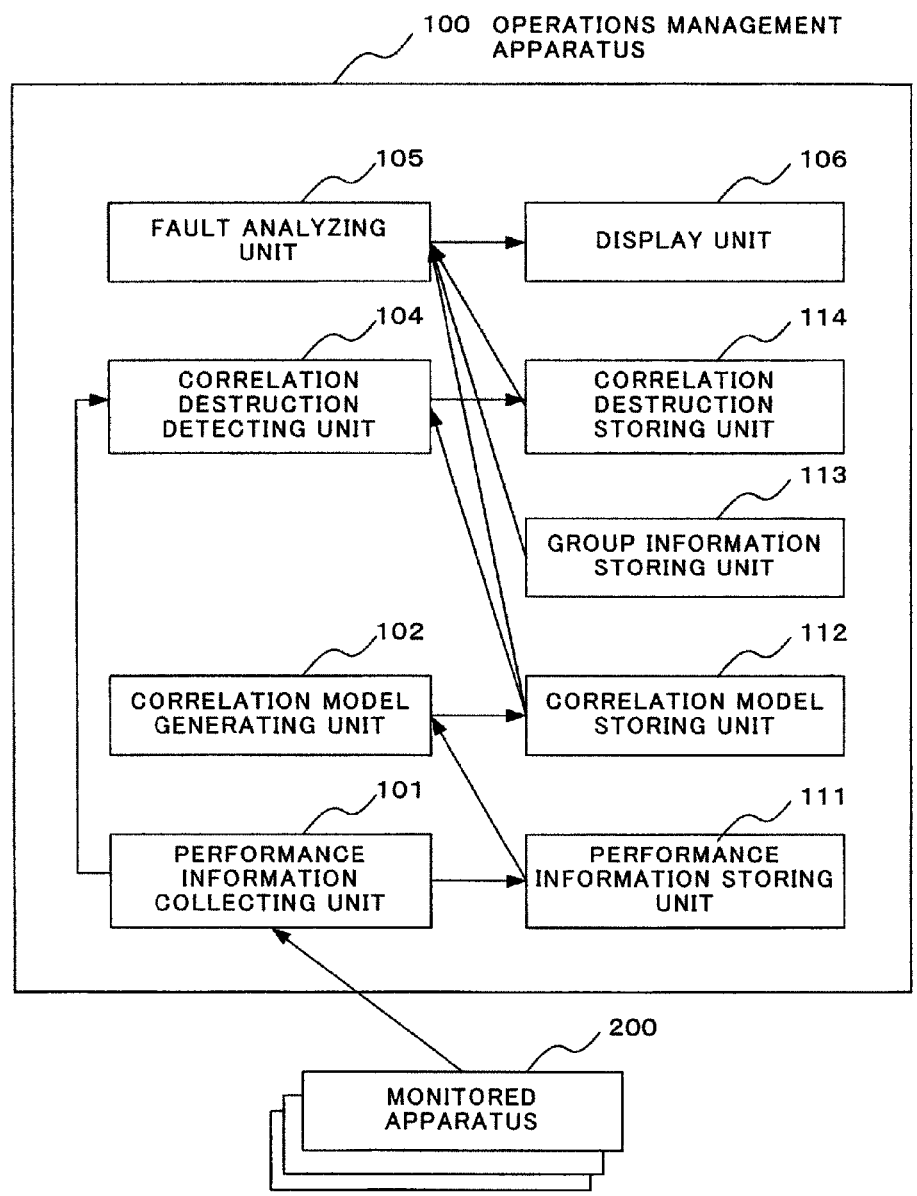
FIG. 2 A block diagram showing a configuration of an operations management system which uses an operations management apparatus 100 according to the first exemplary embodiment of the present invention.

First, a configuration according to the first exemplary embodiment of the present invention will be described. FIG. 2 is a block diagram showing a configuration of an operations management system which uses an operations management apparatus 100 according to the first exemplary embodiment of the present invention.

With reference to FIG. 2, the operations management system according to the first exemplary embodiment of the present invention includes the operations management apparatus (monitoring control apparatus) 100 and a plurality of monitored apparatuses 200.

The operations management apparatus 100, on the basis of performance information collected from the monitored apparatus 200 which is the monitored object, generates a correlation model 122 for each monitored object (monitored apparatus 200), and carries out a fault analysis on the monitored object (monitored apparatus 200) by use of the crated correlation model.

The monitored apparatus 200 is a component of a system which provides a user with service. For example, a Web server, an application server (AP server), a database server (DB server) and the like are exemplified as the monitored apparatus 200.

Figure 3:
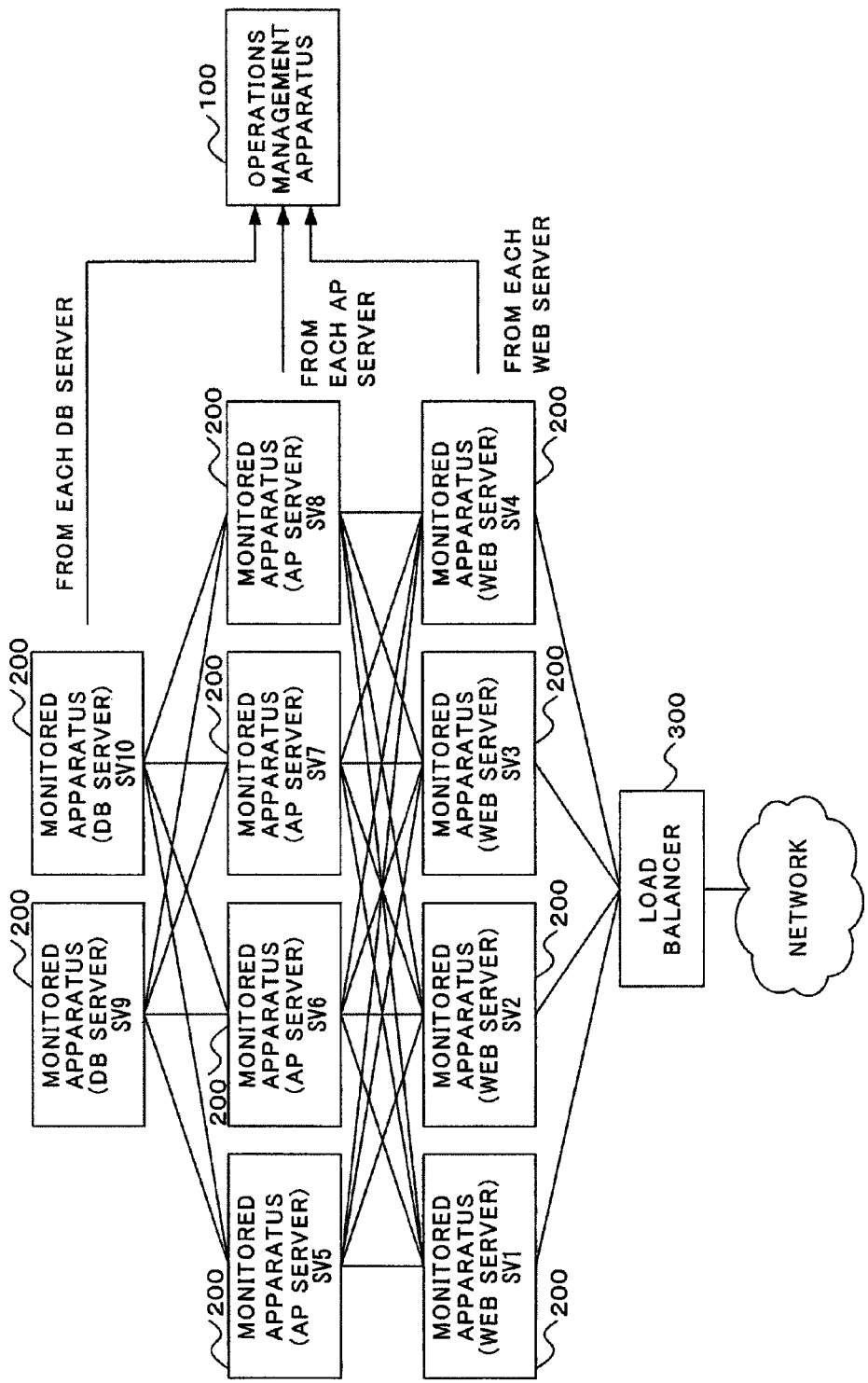
FIG. 3 A diagram showing an example of connections between monitored apparatuses 200 according to the first exemplary embodiment of the present invention.

FIG. 3 is a diagram showing an example of connections between the monitored apparatuses 200 according to the first exemplary embodiment of the present invention. According to the example shown in FIG. 3, the monitored apparatuses 200 compose a hierarchical system which includes a Web server layer, an AP server layer and a DB server layer. The monitored apparatuses 200 with apparatus identifiers SV1 to SV4 are the Web servers. Moreover, the monitored apparatuses 200 with apparatus identifiers SV5 to SV8 are the AP servers. Furthermore, the monitored apparatuses 200 with apparatus identifiers SV9 and SV10 are the DB servers.

Each of the monitored apparatuses 200 included in the Web server layer is connected with each of the monitored apparatuses 200 included in the AP server layer. Moreover, each of the monitored apparatuses 200 included in the AP server layer is connected with each of the monitored apparatuses 200 included in the DB server layer. A request from a user to the system via a network is transferred to each of the monitored apparatuses 200, which is included in the Web server layer, by a load balancer 300. Then, each of the monitored apparatuses 200 included in the Web server layer transfers the request, for example, at random to each of the monitored apparatuses 200 included in the AP server layer.

Moreover, each of the monitored apparatuses 200 measures performance values of plural items at a periodical interval and sends the measured data (measured value) to the operations management apparatus 100. Here, for example, a rate of using CPU (Central Processing Unit) (hereinafter, the rate is denoted as CPU_U), an amount of used memory (hereinafter, denoted as MEM_U), an amount of used disk (hereinafter, denoted as Disk_U), a rate of input/output of disk (Disk_IO), the number of received packets (Packet_R), the number of sent packets (Packet_S) or the like is measured as the item of the performance value.

Here, a set of the monitored apparatus 200 and the item of the performance value is defined as a type of the performance value (performance type (or abbreviated as type)), and a set of the plural types of the performance values measured at the same time is defined as the performance information.

The operations management apparatus 100 includes a performance information collecting unit 101, a correlation model generating unit 102, a correlation destruction detecting unit 104, a fault analyzing unit 105, a display unit 106, a performance information storing unit 111, a correlation model storing unit 112, a group information storing unit 113 and a correlation destruction storing unit 114.

Here, the performance information collecting unit 101 collects the performance information from the monitored apparatus 200, and makes the performance information storing unit 111 store a time-domain sequential change of the performance information as performance sequence information 121.

Figure 4:
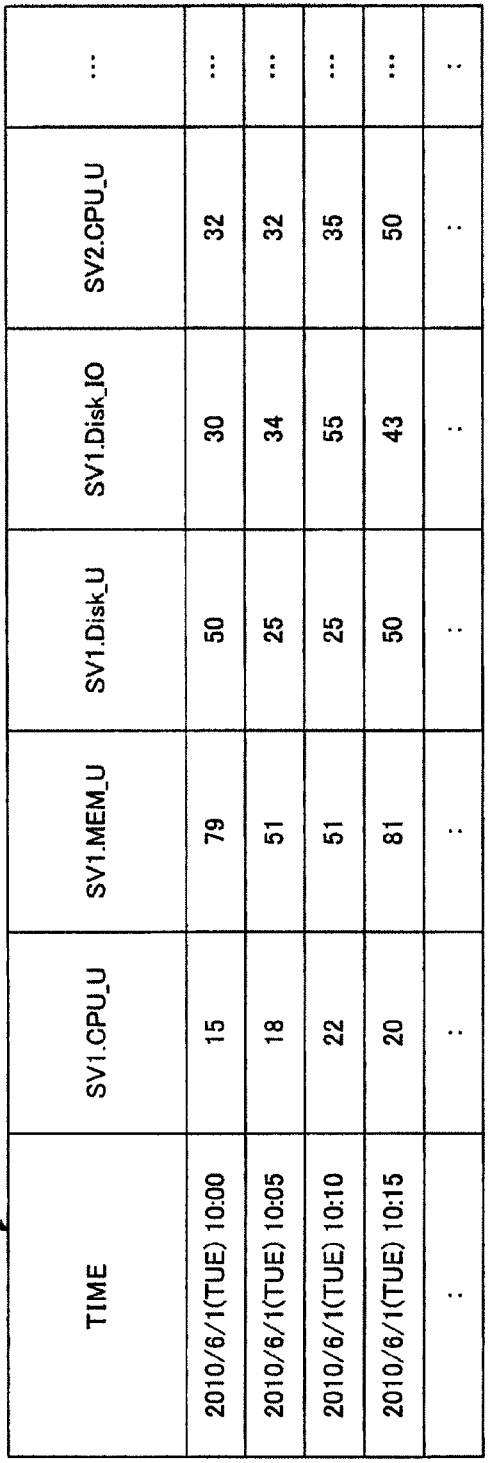
FIG. 4 A diagram showing an example of performance sequence information 121 according to the first exemplary embodiment of the present invention.

FIG. 4 is a diagram showing an example of the performance sequence information 121 according to the first exemplary embodiment of the present invention. According to the example in FIG. 4, the performance sequence information 121 includes a rate of using CPU (SV1.CPU_U), an amount of used memory (SV1.MEM_U), an amount of used disk (SV1.Disk_U) and a rate of input/output of disk (SV1.Disk_IO) of the monitored apparatus 200 with apparatus identifier SV1, a rate of using CPU (SV2.CPU_U) of the monitored apparatus 200 with apparatus identifier SV2, or the like as the performance type.

The correlation model generating unit 102 generates the correlation model 122 for each of the monitored apparatuses 200 on the basis of the performance sequence information 121. Here, for each of the monitored apparatuses 200, the correlation model generating unit 102 determines a correlation function (conversion function), which indicates a correlation for a pair of performance types of performance values out of the plural performance types, on the basis of the performance sequence information 121 which is collected for a predetermined period of time, and generates the correlation model 122 which includes the determined correlation function. The correlation function estimates, on the basis of a tine-domain sequence of measured values of one performance type, the time-domain sequence of the performance value of the other performance type. The correlation function is determined in the system identifying process which is applied to the time-domain sequences of the measured values of a pair of performance types, as shown in the patent literature 1. The correlation model generating unit 102 may calculate a weight for each correlation function on the basis of an average value of conversion error which is caused by the correlation function. Here, the weight becomes small as the average value of the conversion error becomes large. Then, the correlation model generating unit 102 may make only the correlation function, which has the large weight, included in the correlation model 122.

The correlation model storing unit 112 stores the correlation model 122 generated by the correlation model generating unit 102.

Figure 5:
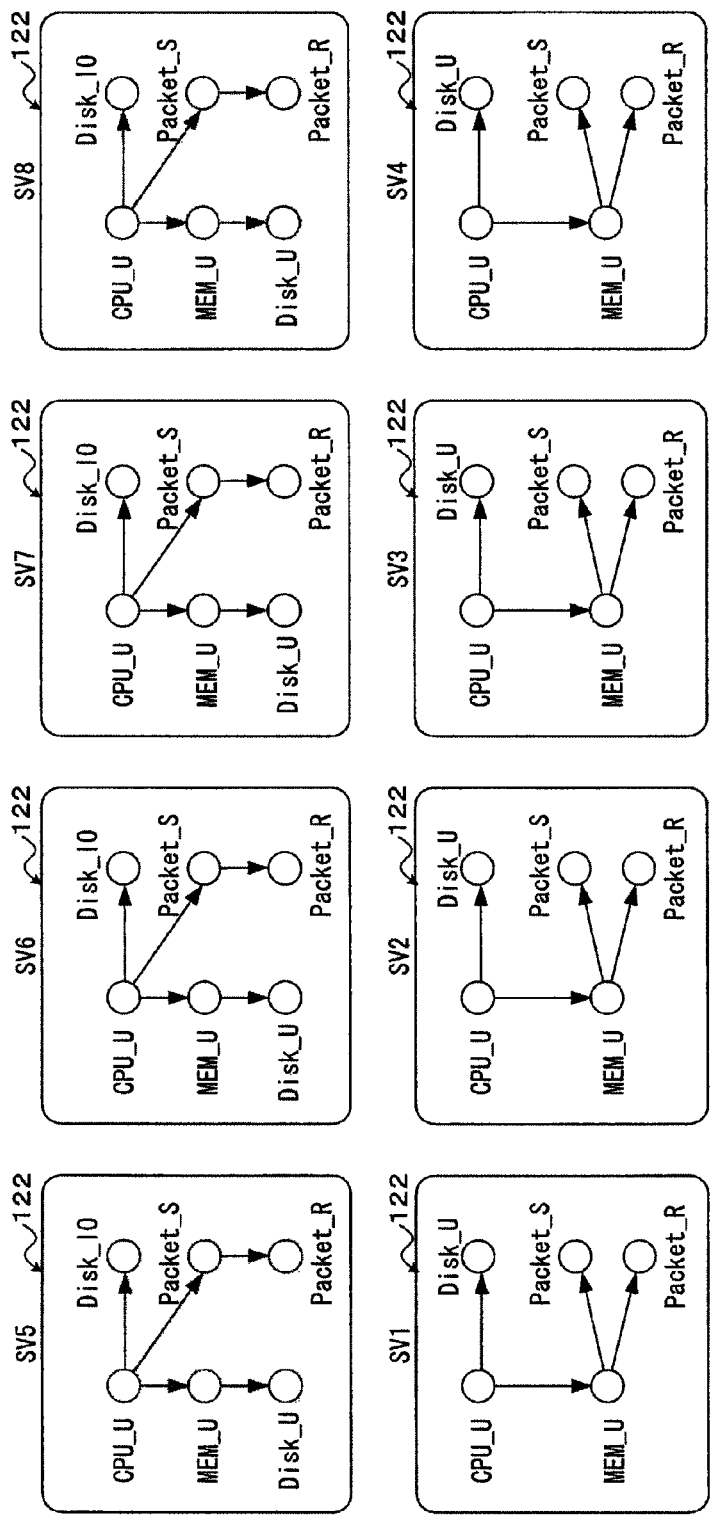
FIG. 5 A diagram showing an example of a correlation model 122 according to the first exemplary embodiment of the present invention.

FIG. 5 is a diagram showing an example of the correlation model 122 according to the first exemplary embodiment of the present invention. In FIG. 5, each node means the performance type, and an arrow indicated by a solid line between the nodes means the correlation from one out of two performance types to the other. According to the example in FIG. 5, the correlation model 122 related to each of the monitored apparatuses 200 apparatus identifiers SV1 to SV4 includes the correlation from CPU_U to MEM_U, from CPU_U to Disk_U, from MEM_U to Packet_S, and from MEM_U to Packet_R. The correlation model 122 related to each of the monitored apparatuses 200 with apparatus identifiers SV5 to SV8 includes the correlation from CPU_U to MEM_U, from CPU_U to Disk_IO, from CPU_U to Packet_S, from MEM_U to Disk_U, and from Packet_S to Packet_R. Moreover, the correlation function (not shown) related to each of the correlations is determined.

The correlation destruction detecting unit 104 detects correlation destruction related to the correlation included in the correlation model 122 of each monitored apparatus 200 by use of the performance information which is inputted newly, and the correlation model 122 which the correlation model storing unit 112 stores. Similarly to the art disclosed in the patent literature 1, in the case that a difference between a value which is obtained through inputting a measured value of one of a pair of performance types among the plural performance types into the correlation function related to the pair of performance types and a measured value of the other of the pair of performance types is equal to or greater than a predetermined value, the correlation destruction detecting unit 104 judges that the correlation destruction for the pair of performance types is detected.

The correlation destruction storing unit 114 stores correlation destruction information 124 indicating the correlation on which the correlation destruction is detected by the correlation destruction detecting unit 104.

Figure 6:
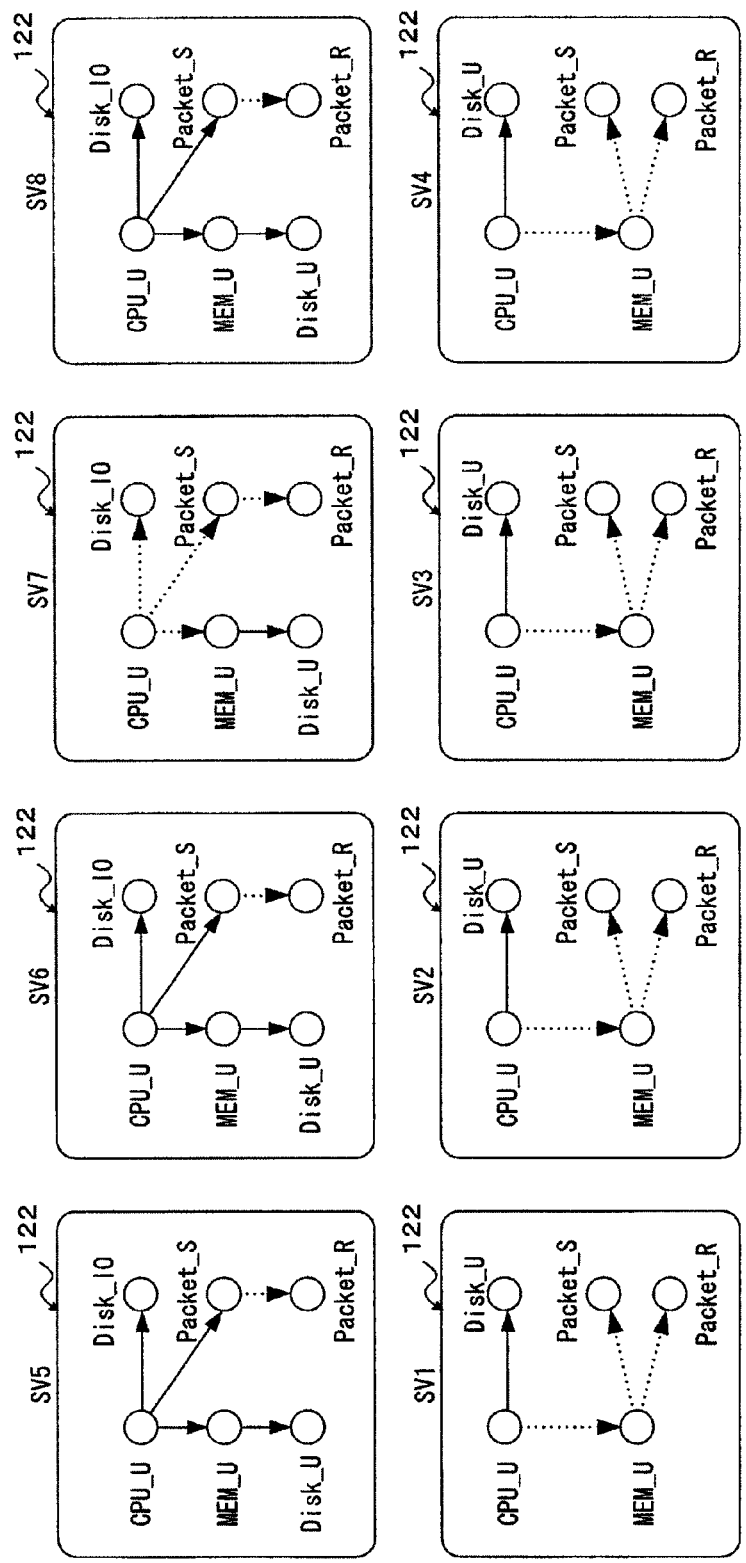
FIG. 6 A diagram showing an example of correlation, on which correlation destruction is detected, according to the first exemplary embodiment of the present invention.

FIG. 6 is a diagram showing an example of the correlation on which the correlation destruction is detected, according to the first exemplary embodiment of the present invention. In FIG. 6, an arrow indicated by a dotted line means the correlation on which the correlation destruction is detected.

Figure 7:
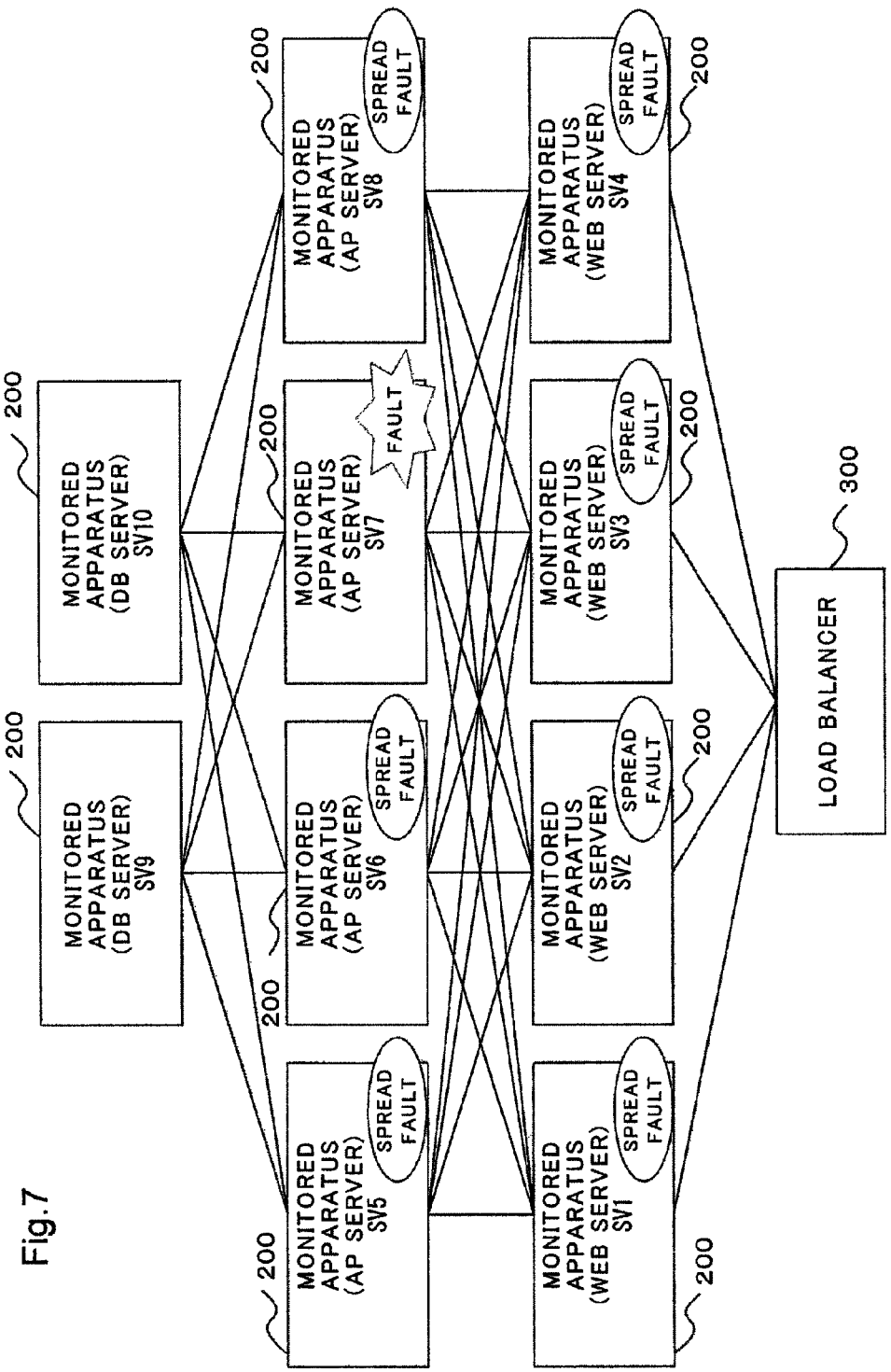
FIG. 7 A diagram showing an example of spread of a fault according to the first exemplary embodiment of the present invention.

Here, the correlation destruction, which is caused due to spread of a fault, according to the first exemplary embodiment of the present invention will be described. FIG. 7 is a diagram showing an example of the spread to of the fault according to the first exemplary embodiment of the present invention.

Here, monitored apparatuses 200 with apparatus identifiers SV1 to SV4, which belong to the Web layer, carry out a similar process each other. Moreover, monitored apparatuses 200 with apparatus identifiers SV5 to SV8, which belong to the AP layer, carry out a similar process each other. Moreover, monitored apparatuses 200 with apparatus identifiers SV9 and SV10, which belong to the DB layer, carry out a similar process each other. Consequently, influence of the fault caused in the other monitored apparatus 200, which is connected directly or indirectly with the monitored apparatuses 200 belonging to the same layer, spreads commonly to the monitored apparatuses 200 belonging to the same layer. Therefore, it is appropriate to consider that a result of judging whether detecting or not detecting the correlation destruction (place where correlation destruction is caused) related to each common correlation is similar among the correlation models 122 of the monitored apparatuses 200 of each layer.

Moreover, it is appropriate to consider that, in the case that the fault is caused in a certain monitored apparatus 200 belonging to a certain layer, the results of judging whether detecting or not detecting the correlation destruction related to each common correlation in the correlation models 122 are different between the monitored apparatus 200 in which the fault is caused and the other monitored apparatuses 200 belonging to the layer.

According to the example in FIG. 7, the fault is caused in the monitored apparatus 200 with apparatus identifier SV7, which belongs to the AP layer, in the hierarchical system shown in FIG. 3. In this case, the correlation destruction due to the fault of the monitored apparatus 200 is caused in the correlation model 122 of the monitored apparatus 200 with apparatus identifier SV7.

Then, influence of the fault caused in the monitored apparatus 200 with apparatus identifier SV7 spreads to the monitored apparatuses 200 with apparatus identifiers SV1 to SV4 which belong to the Web server layer and which are connected directly with the monitored apparatus 200 causing the fault. For example, due to the fault of the monitored apparatus 200 with apparatus identifier SV7, a plurality of replies to requests which the monitored apparatuses 200 with apparatus identifiers SV1 to SV4 send to the monitored apparatus 200 with apparatus identifier SV7 are delayed, and consequently congestion of the request is caused in the monitored apparatuses 200 with apparatus identifiers SV1 to SV4. In this case, the result of judging whether detecting or not detecting the correlation destruction related to each common relation is similar each other among the monitored apparatuses 200 with apparatus identifiers SV1 to SV4.

Furthermore, the influence of the fault caused in the monitored apparatus 200 with apparatus identifier SV7 spreads to the monitored apparatuses 200 with apparatus identifiers SV5, SV6, and SV8 which are connected indirectly, that is, which are connected via the monitored apparatuses 200 with apparatus identifiers SV1 to SV4, with the monitored apparatus 200 causing the fault. For example, delay in communication between each of the monitored apparatuses 200 with apparatus identifiers SV5, SV6 and SV8 and each of the monitored apparatuses 200 with apparatus identifiers SV1 to SV4 is caused due to the congestion of the request, which is caused in the monitored apparatuses 200 with apparatus identifiers SV1 to SV4. In this case, the results of judging whether detecting or not detecting the correlation destruction related to each common correlation are different between the monitored apparatus 200 with apparatus identifier SV7 in which the fault is caused and the monitored apparatuses 200 with apparatus identifiers SV5, SV6 and SV8 to which the fault spreads.

Accordingly, it is possible to identify the monitored apparatus 200, which should be a candidate to cause the fault, through comparing the results of judging whether detecting or not detecting the correlation destruction related to each common correlation in the monitored apparatuses 200 included in each layer, and extracting one monitored apparatus 200 with the different result from the results of the other monitored apparatuses 200.

Figure 8:
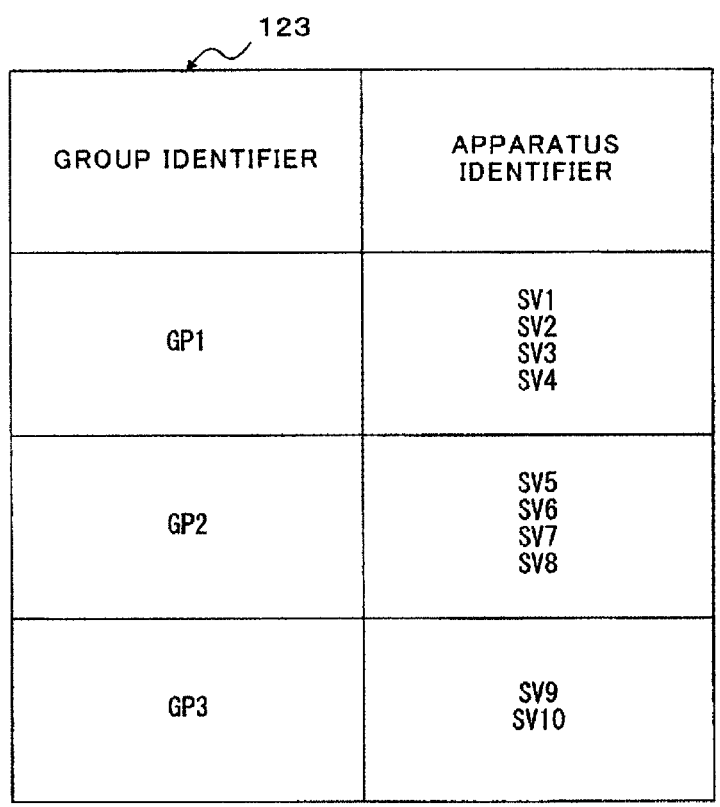
FIG. 8 A diagram showing an example of group information 123 according to the first exemplary embodiment of the present invention.

The group information storing unit 113 stores group information 123. FIG. 8 is a diagram showing an example of the group information 123 according to the first exemplary embodiment of the present invention. The group information 123 includes a group identifier which identifies a group, and the apparatus identifier of the monitored apparatus 200 which is included in the group.

Each group in the group information 123 is set in such a way that the monitored apparatuses 200, which are connected directly or indirectly with another common monitored apparatus 200 and have the common correlation (correlation model 122 is similar), are included in the same group.

According to the first exemplary embodiment of the present invention, each layer in the hierarchical system shown in FIG. 3 is set as the group. According to the example shown in FIG. 8, the Web server layer, the AP server layer and the DB server layer of the hierarchical system shown in FIG. 3 are set by a manager or the like in advance as the groups with group identifiers GP1, GP2 and GP3.

The fault analyzing unit 105 identifies the monitored apparatus 200, which should be the candidate to cause the fault (fault causing candidate), through comparing the results of judging whether detecting or not detecting the correlation destruction related to each common correlation in the monitored apparatuses 200 included in each group, on the basis of the group information 123 and the correlation destruction information 124, and outputs the identification.

Here, the operations management apparatus 100 may include CPU (Central Processing Unit) and a storage medium, which stores a program, and works as a computer which operates with control based on the program. Moreover, the performance information storing unit 111, the correlation model storing unit 112, the group information storing unit 113 and the correlation destruction storing unit 114 may be installed in different storage media or in one storage medium.

Next, an operation of the operations management apparatus 100 according to the first exemplary embodiment of the present invention will be described.

Figure 9:
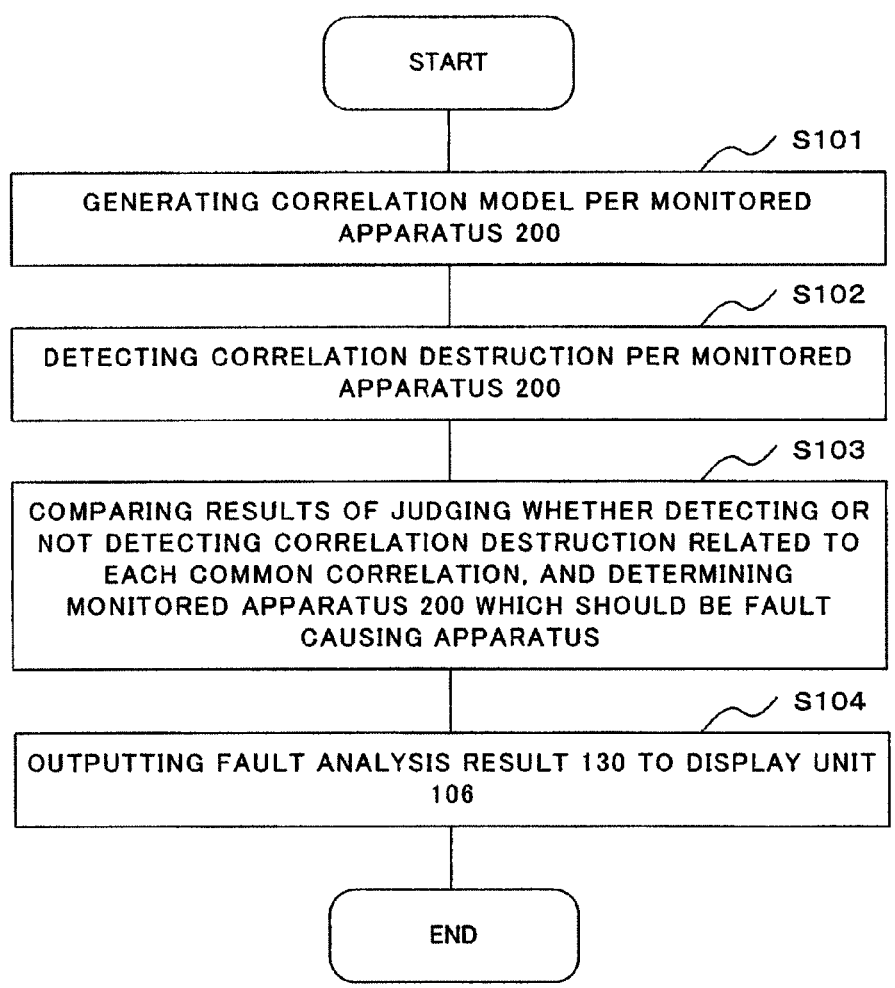
FIG. 9 A flowchart showing overall processes of the operations management apparatus 100 according to the first exemplary embodiment of the present invention.

FIG. 9 is a flowchart showing overall processes of the operations management apparatus 100 according to the first exemplary embodiment of the present invention.

First, the correlation model generating unit 102 of the operations management apparatus 100 generates a correlation model 122 of each of monitored apparatuses 200 on the basis of performance sequence information 121 which the performance information storing unit 111 stores. The correlation model generating unit 102 makes the correlation model storing unit 12 store the generated correlation models 122 (Step S101).

For example, the correlation model generating unit 102 generates the correlation models 122 of the monitored apparatuses 200 with apparatus identifiers SV1 to SV8, by use of the performance sequence information 121 shown in FIG. 4, as shown in FIG. 5.

Next, the correlation destruction detecting unit 104 detects correlation destruction related to a correlation included in the correlation model 122 of each of monitored apparatuses 200 by use of performance information which is inputted newly from the information collecting unit 101, and the correlation model 122 which the correlation model storing unit 112 stores. The correlation destruction detecting unit 104 generates correlation destruction information 124, which indicates the detected correlation, and makes the correlation destruction storing unit 114 store the correlation destruction information 124 (Step S102).

For example, as shown in FIG. 6, the correlation destruction detecting unit 104 detects the correlation destruction related to the correlation models 122 of the monitored apparatuses 200 with apparatus identifiers SV1 to SV8 shown in FIG. 5.

Next, the fault analyzing unit 105, through comparing the results of judging whether detecting or not detecting the correlation destruction related to each common correlation (place where the fault is detected) in the monitored apparatuses 200 which are included in each group indicated by group information 123, determines that the monitored apparatus 200 with the different result from the other results of monitored apparatuses 200 belonging to the group is a fault causing candidate (Step S103).

Here, the fault analyzing unit 105 calculates degree of similarity on the result of judging whether detecting or not detecting the correlation destruction related to each common correlation in the monitoring apparatuses 200 of each group, and determines that the monitored apparatus 100, whose degree of the similarity is equal to or smaller than a predetermined value, is the fault causing candidate, or determines that a predetermined number of the monitored apparatuses 200, which are selected in an order of the low degree of the similarity, are the fault causing candidates. With regard to a method for calculating the degree of the similarity, any method is applicable as far as it is possible to compare the results of judging whether detecting or not detecting the correlation destruction related to each common correlation in a plurality of the correlation models 122.

For example, in the case that the cosine type degree of the similarity between a vector whose element is the result of judging whether detecting or not detecting the correlation destruction related to each common correlation, and an average vector of the above-mentioned vectors related to the monitored apparatuses 200 belonging to the group is used as the degree of the similarity, the fault analyzing unit 105 calculates the degree of the similarity Si related to the monitored apparatus i, which is included in the group, by use of equation 1 shown in the following.

$$S_i = \frac{B_i \cdot B_{avg}}{(|B_i| \times |B_{avg}|)} \quad \text{[Equation 1]}$$

wherein $$B_i = \begin{pmatrix} b_{i,1} \\ b_{i,2} \\ \vdots \\ b_{i,M} \end{pmatrix},$$

$$B_{avg} = \left(\sum_i B_i\right) / N$$

correlation destruction related to correlation j of monitored apparatus i:

$$b_{i,j} = \begin{cases} 0 & \text{(in case of existence of correlation destruction)} \\ 1 & \text{(in case of no existence of correlation destruction)} \end{cases}$$

i=1, 2, ..., N (number of monitored apparatuses in group)
j=1, 2, ..., M (number of correlations)

FIG. 10 is a diagram showing a result of calculating the degree of the similarity on the result of judging whether detecting or not detecting the correlation destruction according to the first exemplary embodiment of the present invention.

For example, the fault analyzing unit 105 calculates the degree of the similarity on the correlation destruction shown in FIG. 6, as shown in FIG. 10. Here, in the case that four monitored apparatuses 200 are selected in an order of low degree of the similarity and are determined to be the fault causing candidates, the fault analyzing unit 105 determines that the monitored apparatuses 200 with apparatus identifiers SV5 to SV8 are the fault causing candidates.

Note that, it may be preferable that the fault analyzing unit 105 calculates degree of coincidence, instead of the degree of the similarity, through comparing the vector, whose element is the result of judging whether detecting or not detecting the correlation destruction, with a reference vector which is calculated with a predetermined method, and the fault analyzing unit 105 determines that the monitored apparatus 200 whose degree of the coincidence is equal to or greater than a predetermined value is the fault causing candidate, or determines that a predetermined number of the monitored apparatuses 200 which are selected in an order of low degree of the coincidence are the fault causing candidates. In this case, the fault analyzing unit 105 calculates the reference vector, for example, through calculating a logical sum of the vector Bi (i=1, ..., N), whose element is the result of judging whether detecting or not detecting the correlation destruction, in the equation 1, and calculates the degree of the coincidence on the basis of number of the coincident elements when comparing the elements of each vector Bi with the elements of the reference vector.

Next, the fault analyzing unit 105 outputs a fault analysis result 130 including information on the monitored apparatus 200, which is the fault causing candidate, to the display unit 106 (Step S104).

Figure 11:
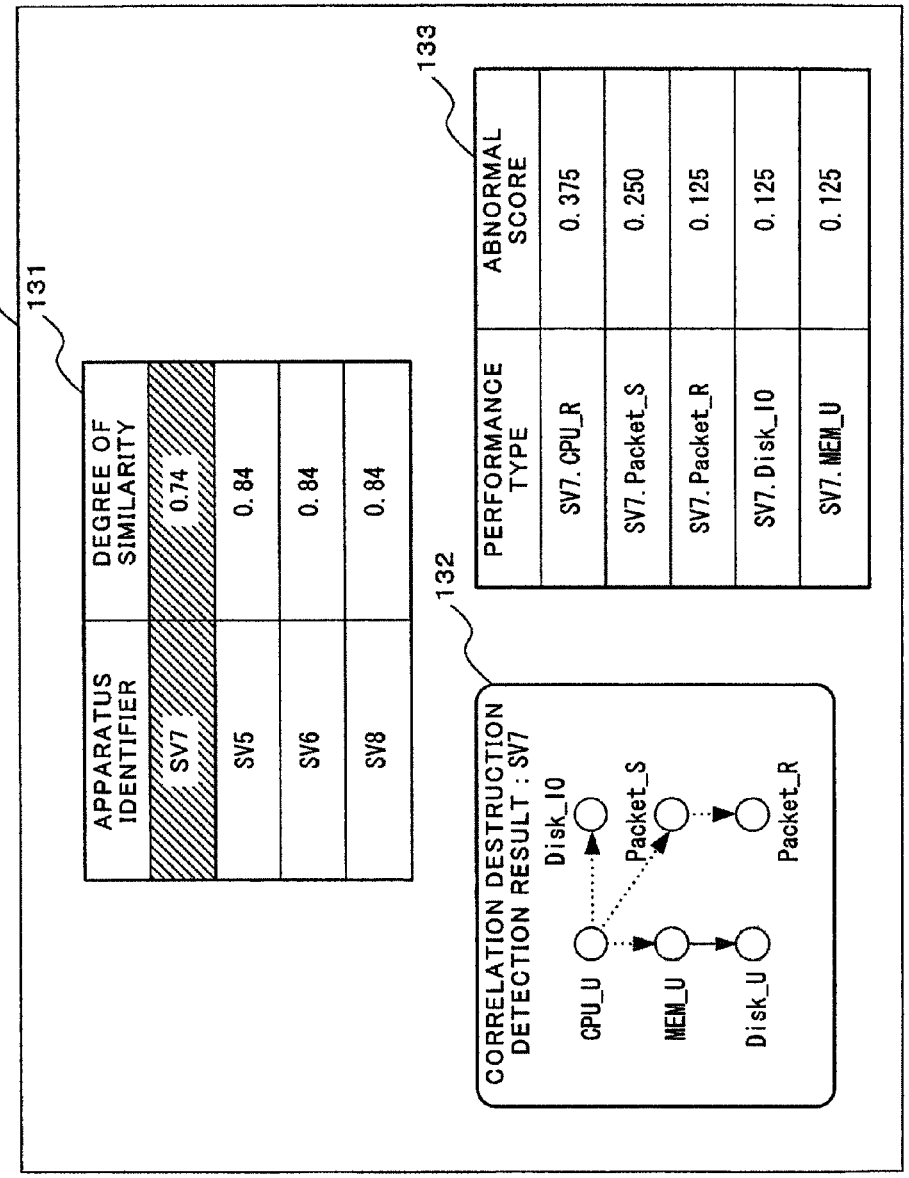
FIG. 11 A diagram showing an example of a fault analysis result 130 according to the first exemplary embodiment of the present invention.

FIG. 11 is a diagram showing an example of the fault analysis result 130 according to the first exemplary embodiment of the present invention. For example, the fault analyzing unit 105 outputs the fault analysis result 130 shown in FIG. 11 to the display unit 106. According to FIG. 11, the fault analysis result 130 includes a fault causing candidate list 131, a correlation destruction detection result 132 and an abnormal score list 133.

The fault causing candidate list 131 indicates the apparatus identifier of the monitored apparatus 200 which is the fault causing candidate, and the degree of the similarity of the monitored apparatus 200 which is the fault causing candidate. The apparatus identifiers of the monitored apparatuses 200 with apparatus identifiers SV5 to SV8, which are the fault causing candidates, are shown in an order of low degree of the similarity in the example of FIG. 11.

The correlation destruction detection result 132 indicates the correlation on which the correlation destruction is detected, in the monitored apparatus 200 which is the fault causing candidate. According to the example in FIG. 11, the correlation on which the correlation destruction is detected is indicated on the correlation model 122 together with the performance type with regard to the monitored apparatus 200 with apparatus identifier SV7, which has the lowest degree of the similarity and which is selected out of the fault causing candidates by the manager or the like.

The abnormal score list 133 indicates the performance type and an abnormal score of the performance type which are related to the correlation on which the correlation destruction is detected, in the monitored apparatus 200 which is the fault causing candidate. Here, the abnormal score, which indicates degree of convergence of the correlation destruction with regard to the performance type, is calculated. The abnormal score is calculated, for example, with the same method as one described in the patent literature 1. According to the example in FIG. 11, the performance types related to the correlations on which the correlation destruction is detected in the monitored apparatus 200 with apparatus identifier SV7 are indicated in an order of high abnormal score.

Through referring to the fault analysis result 130 displayed by the display unit 106, the manager can identify the monitored apparatus 200 which should be the fault causing candidate and the performance type in which the convergence of the correlation destruction is caused in the monitored apparatus 200, as an object for investigating the cause of the fault.

For example, through referring to the fault analysis result 130 shown in FIG. 11, the manager identifies the monitored apparatus 200 with apparatus identifier SV7 as the investigation object, and consequently the manager can investigate a rate of using CPU, which has high abnormal score, with priority.

With that, the operation according to the first exemplary embodiment of the present invention is completed.

Figure 1:
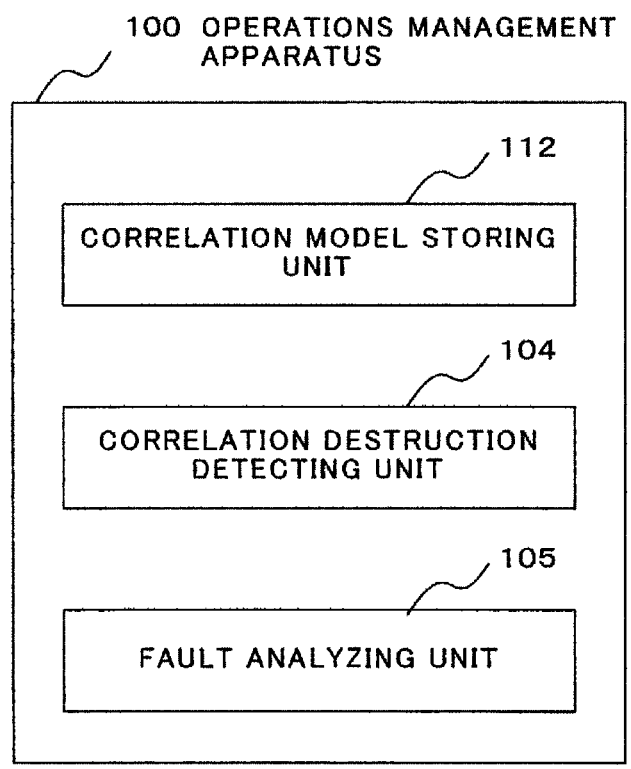
FIG. 1 A block diagram showing a characteristic configuration according to a first exemplary embodiment of the present invention.

Next, a characteristic configuration of the first exemplary embodiment of the present invention will be described. FIG. 1 is a block diagram showing a characteristic configuration according to the first exemplary embodiment of the present invention.

Referring to FIG. 1, the operations management apparatus 100 includes a correlation model storing unit 112, a correlation destruction detecting unit 104, and a fault analyzing unit 105.

Here, the correlation model storing unit 112 stores a correlation model 122 including one or more correlation functions each of which indicates a correlation for a pair of types of performance values out of a plural types of performance values, for each of plural monitored objects.

The correlation destruction detecting unit 104 detects correlation destruction related to a correlation which is included in the correlation model 122 by applying inputted the performance value of the monitored object to the correlation model 122 of the monitored object which the correlation model storing unit 112 stores.

The fault analyzing unit 105 determines and outputs the monitored object which should be a candidate to cause a fault through comparing results of judging whether detecting or not detecting the correlation destruction related to a common correlation in a plurality of the monitored objects which are connected directly or indirectly with a common apparatus or common the monitored object and which have the correlation models 122 including the common correlation.

According to the first exemplary embodiment of the present invention, an operations management apparatus 100, which detects a fault of a system on the basis of correlation destruction on a correlation model 122, can identify a candidate to cause the fault even if the correlation destruction is detected in a plurality of processing apparatuses or the like due to the spread of the fault of the system. The reason is that a fault analyzing unit 105 identifies a monitored apparatus 200, which should be a fault causing candidate, through comparing results of judging whether detecting or not detecting correlation destruction related to each common correlation in a plurality of the monitored apparatuses 200 which are connected directly or indirectly with a common apparatus or common other monitored apparatus 200 and which have correlation models 122 including the common correlation.

According to the first exemplary embodiment of the present invention, a manager or the like can identify easily a performance type which should be investigated with priority in the monitored apparatus 200 which is the candidate to cause the fault. The reason is that the fault analyzing unit 105 outputs the correlation on which the correlation destruction is detected, which is included in the correlation model 122 of the monitored apparatus 200 determined as the candidate to cause the fault, in association with a type of a performance value related to the correlation.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, while one monitored apparatus 200 is defined as one monitored object, the correlation model 122 is generated for each monitored object, and the monitored object which should be the fault causing candidate is determined according to the first exemplary embodiment of the present invention, the present invention is not limited to the first exemplary embodiment. A plurality of the monitored apparatuses 200 may be defined as one monitored object. Moreover, a logical composition unit which can provide a function on the monitored apparatus 200, such as a virtual machine which works on the monitored apparatus 200, may be defined as one monitored object.

Moreover, while the manager or the like sets each layer of the hierarchical system to the group information 123 as a group according to the first exemplary embodiment of the present invention, it may be preferable that a group information generating unit (not shown in the figure) of the operations management apparatus 100 sets the group information 123 in such a way that the monitored apparatuses 200, which have the common correlation (have the similar correlation model 122), are included in the same group through comparing the correlation models 122 of the plural monitored apparatuses 200 which are connected directly or indirectly with the common apparatus or the common other monitored apparatus 200 (for example, through carrying out clustering based on clustering algorithm).

This application is based upon and claims the benefit of priority from Japanese Patent Application No. 2010-282727, filed on Dec. 20, 2010, the disclosure of which is incorporated herein in its entirety by reference.

REFERENCE SIGNS LIST

100 Operations management apparatus
101 Performance information collecting unit
102 Correlation model generating unit
104 Correlation destruction detecting unit
105 Fault analyzing unit
106 Display unit
111 Performance information storing unit
112 Correlation model storing unit
113 Group information storing unit
114 Correlation destruction storing unit
121 Performance sequence information
122 Correlation model
123 Group information
124 Correlation destruction information
130 Fault analysis result
131 Fault causing candidate list
132 Correlation destruction detection result
133 Abnormal score list
200 Monitored apparatus
300 Load balancer

What is claimed is:

1. An operations management apparatus, comprising:
a correlation model storing unit which stores a correlation model including one or more correlation functions each of which indicates a correlation for a pair of types of performance values out of a plural types of performance values, for each of plural monitored objects;
a correlation destruction detecting unit which detects correlation destruction related to a correlation which is included in said correlation model by applying inputted said performance value of said monitored object to said correlation model of said monitored object which said correlation model storing means stores; and
a fault analyzing unit which determines and outputs said monitored object which should be a candidate to cause a fault through comparing results of judging whether detecting or not detecting said correlation destruction related to a common correlation in a plurality of said monitored objects which are connected directly or indirectly with a common apparatus or common said monitored object and which have said correlation models including said common correlation.

2. The operations management apparatus according to claim 1, wherein
said fault analyzing unit determines said monitored object having low degree of similarity on said result of judging whether detecting or not detecting said correlation destruction related to said common correlation in comparison with another monitored object as said candidate to cause a fault.

3. The operations management apparatus according to claim 1, wherein said plural monitored objects are grouped into a plurality of layers, and each of said monitored objects belonging to one layer out of two adjacent said layers is connected with each of said monitored objects belonging to the other layer, and said correlation models of said plural monitored objects belonging to each of said plural layers include said common correlation, and said fault analyzing unit compares said results of judging whether detecting or not detecting said correlation destruction related to said common correlation in said plural monitored objects belonging to each of said plural layers.

4. The operations management apparatus according to claim 1, wherein said fault analyzing unit outputs a correlation on which said correlation destruction is detected, which is included in said correlation model of said monitored object determined as said candidate to cause a fault, in association with a type of a performance value related to said correlation on which said correlation destruction is detected.

5. The operations management apparatus according to claim 1, further comprising:

a group information generating unit which extracts a group including said plural monitored objects each having said correlation model including said common correlation, through comparing said correlation models in said plural monitored objects which are connected directly or indirectly with said common apparatus or said common said monitored object.

6. An operations management method, comprising:

storing a correlation model including one or more correlation functions each of which indicates a correlation for a pair of types of performance values out of a plural types of performance values, for each of plural monitored objects;

detecting correlation destruction related to a correlation which is included in said correlation model by applying inputted said performance value of said monitored object to said correlation model of said monitored object; and determining and outputting said monitored object which should be a candidate to cause a fault through comparing results of judging whether detecting or not detecting said correlation destruction related to a common correlation in a plurality of said monitored objects which are connected directly or indirectly with a common apparatus or common said monitored object and which have said correlation models including said common correlation.

7. The operations management hod according to claim 6, wherein said determining determines said monitored object having low degree of similarity on said result of judging whether detecting or not detecting said correlation destruction related to said common correlation in comparison with another monitored object as said candidate to cause a fault.

8. The operations management method according to claim 6, wherein said plural monitored objects are grouped into a plurality of layers, and each of said monitored objects belonging to one layer out of two adjacent said layers is connected with each of said monitored objects belonging to the other layer, and said correlation models of said plural monitored objects belonging to each of said plural layers include said common correlation, and said determining compares said results of judging whether detecting or not detecting said correlation destruction related to said common correlation in said plural monitored objects belonging to each of said plural layers.

9. The operations management method according to claim 6, wherein said outputting outputs a correlation on which said correlation destruction is detected, which is included in said correlation model of said monitored object determined as said candidate to cause a fault, in association with a type of a performance value related to said correlation on which said correlation destruction is detected.

10. The operations management method according to claim 6, further comprising:

extracting a group including said plural monitored objects each having said correlation model including said common correlation, through comparing said correlation models in said plural monitored objects which are connected directly or indirectly with said common apparatus or said common said monitored object.

11. A non-transitory computer readable storage medium recording thereon a program, causing a computer to perform a method comprising:

storing a correlation model including one or more correlation functions each of which indicates a correlation for a pair of types of performance values out of a plural types of performance values, for each of plural monitored objects;

detecting correlation destruction related to a correlation which is included in said correlation model by applying inputted said performance value of said monitored object to said correlation model of said monitored object; and determining and outputting said monitored object which should be a candidate to cause a fault through comparing results of judging whether detecting or not detecting said correlation destruction related to a common correlation in a plurality of said monitored objects which are connected directly or indirectly with a common apparatus or common said monitored object and which have said correlation models including said common correlation.

12. The non-transitory computer readable storage medium according to claim 11, recording thereon said program causing said computer to perform said method, wherein said determining determines said monitored object having low degree of similarity on said result of judging whether detecting or not detecting said correlation destruction related to said common correlation in comparison with another monitored object as said candidate to cause a fault.

13. The non-transitory computer readable storage medium according to claim 11, recording thereon said program causing said computer to perform said method, wherein said plural monitored objects are grouped into a plurality of layers, and each of said monitored objects belonging to one layer out of two adjacent said layers is connected with each of said monitored objects belonging to the other layer, and said correlation models of said plural monitored objects belonging to each of said plural layers include said common correlation, and said determining compares said results of judging whether detecting or not detecting said correlation destruction related to said common correlation in said plural monitored objects belonging to each of said plural layers.

14. The non-transitory computer readable storage medium according to claim 11, recording thereon said program causing said computer to perform said method, wherein
said outputting outputs a correlation on which said correlation destruction is detected, which is included in said correlation model of said monitored object determined as said candidate to cause a fault, in association with a type of a performance value related to said correlation on which said correlation destruction is detected.

15. The non-transitory computer readable storage medium according to claim 11, recording thereon said program causing said computer to perform said method, further comprising:
extracting a group including said plural monitored objects each having said correlation model including said common correlation, through comparing said correlation models in said plural monitored objects which are connected directly or indirectly with said common apparatus or said common said monitored object.

16. An operations management apparatus, comprising:
a correlation model storing unit which stores a correlation mode including one or more correlation functions each of which indicates a correlation for a pair of types of performance values out of a plural types of performance values, for each of plural monitored objects;
a correlation destruction detecting unit which detects correlation destruction related to a correlation which is included in said correlation model by applying inputted said performance value of said monitored object to said correlation model of said monitored object which said correlation model storing means stores; and
a fault analyzing unit which determines and outputs said monitored object which should be a candidate to cause a fault through comparing results of judging whether detecting or not detecting said correlation destruction related to a common correlation in said plural monitored objects which provide the same function each other, said plural monitored objects receiving a request for processing issued by a common apparatus or common said monitored object or using a result of a process carried out by a common apparatus or common said monitored object.

17. The operations management apparatus according to claim 16, wherein
said fault analyzing unit determines said monitored object having low degree of similarity on said result of judging whether detecting or not detecting said correlation destruction related to said common correlation in comparison with another monitored object as said candidate to cause a fault.

18. The operations management apparatus according to claim 16, wherein
said fault analyzing unit outputs a correlation on which said correlation destruction is detected, which is included in said correlation model of said monitored object determined as said candidate to cause a fault, in association with a type of a performance value related to said correlation on which said correlation destruction is detected.

19. The operations management apparatus according to claim 16, further comprising:
a group information generating unit which extracts a group including said plural monitored objects each having said correlation model including said common correlation, through comparing said correlation models in said plural monitored objects which provide the same function each other, said plural monitored objects receiving a request for processing issued by said common apparatus or said common said monitored object or using a result of a process carried out by said common apparatus or said common said monitored object.

20. An operations management method, comprising:
storing a correlation mode including one or more correlation functions each of which indicates a correlation for a pair of types of performance values out of a plural types of performance values, for each of plural monitored objects;
detecting correlation destruction related to a correlation which is included in said correlation model by applying inputted said performance value of said monitored object to said correlation model of said monitored object; and
determining and outputting said monitored object which should be a candidate to cause a fault through comparing results of judging whether detecting or not detecting said correlation destruction related to a common correlation in said plural monitored objects which provide the same function each other, said plural monitored objects receiving a request for processing issued by a common apparatus or common said monitored object or using a result of a process carried out by a common apparatus or common said monitored object.

21. The operations management method according to claim 20, wherein
said determining determines said monitored object having low degree of similarity on said result of judging whether detecting or not detecting said correlation destruction related to said common correlation in comparison with another monitored object as said candidate to cause a fault.

22. The operations management method according to claim 20, wherein
said outputting outputs a correlation on which said correlation destruction is detected, which is included in said correlation model of said monitored object determined as said candidate to cause a fault, in association with a type of a performance value related to said correlation on which said correlation destruction is detected.

23. The operations management method according to claim 20, further comprising:
extracting a group including said plural monitored objects each having said correlation model including said common correlation, through comparing said correlation models in said plural monitored objects which provide the same function each other, said plural monitored objects receiving a request for processing issued by said common apparatus or said common said monitored object or using a result of a process carried out by said common apparatus or said common said monitored object.

24. An operations management apparatus, comprising:
correlation model storing means for storing a correlation model including one or more correlation functions each of which indicates a correlation for a pair of types of performance values out of a plural types of performance values, for each of plural monitored objects;
correlation destruction detecting means for detecting correlation destruction related to a correlation which is included in said correlation model by applying inputted said performance value of said monitored object to said correlation model of said monitored object which said correlation model storing means stores; and fault analyzing means for determining and outputting said monitored object which should be a candidate to cause a fault through comparing results of judging whether detecting or not detecting said correlation destruction related to a common correlation in a plurality of said monitored objects which are connected directly or indirectly with a common apparatus or common said monitored object and which have said correlation models including said common correlation.

25. An operations management apparatus, comprising:
correlation model storing means for storing a correlation mode including one or more correlation functions each of which indicates a correlation for a pair of types of performance values out of a plural types of performance values, for each of plural monitored objects;
correlation destruction detecting means for detecting correlation destruction related to a correlation which is included in said correlation model by applying inputted said performance value of said monitored object to said correlation model of said monitored object which said correlation model storing means stores; and
fault analyzing means for determining and outputting said monitored object which should be a candidate to cause a fault through comparing results of judging whether detecting or not detecting said correlation destruction related to a common correlation in said plural monitored objects which provide the same function each other, said plural monitored objects receiving a request for processing issued by a common apparatus or common said monitored object or using a result of a process carried out by a common apparatus or common said monitored object.

* * * * *